(12) United States Patent
Degtiarov

(10) Patent No.: US 9,292,351 B2
(45) Date of Patent: Mar. 22, 2016

(54) DISTRIBUTED FABRIC ARCHITECTURE IN A CLOUD COMPUTING ENVIRONMENT

(75) Inventor: Arkady M. Degtiarov, Newton, MA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 244 days.

(21) Appl. No.: 13/524,076

(22) Filed: Jun. 15, 2012

(65) Prior Publication Data

US 2013/0339423 A1   Dec. 19, 2013

(51) Int. Cl.
*H04L 12/46* (2006.01)
*G06F 9/50* (2006.01)

(52) U.S. Cl.
CPC ........... *G06F 9/5072* (2013.01); *H04L 12/4641* (2013.01)

(58) Field of Classification Search
CPC .... H04L 29/06; H04L 12/4641; G06F 9/5072
See application file for complete search history.

(56) References Cited

U.S. PATENT DOCUMENTS

| | | | | |
|---|---|---|---|---|
| 7,466,710 B1* | 12/2008 | Clemm et al. | | 370/401 |
| 8,027,354 B1* | 9/2011 | Portolani et al. | | 370/431 |
| 8,281,377 B1* | 10/2012 | Snow | | H04N 21/41407 726/11 |
| 2002/0194369 A1* | 12/2002 | Rawlins et al. | | 709/238 |
| 2004/0133619 A1* | 7/2004 | Zelig et al. | | 709/200 |
| 2007/0237135 A1* | 10/2007 | Trevallyn-Jones et al. | ... | 370/354 |
| 2009/0106439 A1* | 4/2009 | Twitchell, Jr. | | 709/230 |
| 2010/0214949 A1* | 8/2010 | Smith et al. | | 370/254 |
| 2010/0296394 A1* | 11/2010 | Krzanowski | | 370/228 |
| 2011/0075664 A1* | 3/2011 | Lambeth et al. | | 370/390 |
| 2011/0090911 A1* | 4/2011 | Hao et al. | | 370/395.53 |
| 2011/0307716 A1* | 12/2011 | Diab | | 713/300 |
| 2012/0027018 A1* | 2/2012 | Ilyadis | | 370/392 |
| 2012/0110185 A1* | 5/2012 | Ganesan et al. | | 709/226 |
| 2013/0132948 A1* | 5/2013 | Hari et al. | | 718/1 |
| 2013/0305344 A1* | 11/2013 | Alicherry | | H04L 63/0272 726/12 |

* cited by examiner

*Primary Examiner* — Joe Chacko

(57) ABSTRACT

A device creates a local forwarding function in a virtual machine of a device associated with a cloud computing environment, where the local forwarding function local forwarding function connects the device with local devices associated with the cloud computing environment. The device creates a global forwarding function in the virtual machine, where the global forwarding function connects the device with global devices associated with other cloud computing environments. The device also creates, in the virtual machine, a virtual control plane that controls the local forwarding function and the global forwarding function. The device communicates, via the local forwarding function, first traffic with a particular local device of the local devices, and communicates, via the global forwarding function, second traffic with a particular global device of the global devices.

20 Claims, 12 Drawing Sheets

DISTRIBUTED FABRIC ARCHITECTURE IN A CLOUD COMPUTING ENVIRONMENT

BACKGROUND

Cloud computing is the delivery of computing as a service rather than as a product, whereby shared resources, software, and information are provided to client devices (e.g., computers, smart phones, etc.) as a utility over a network, such as the Internet. Cloud computing environments provide computation, software, data access, and/or storage services that do not require end-user knowledge of a physical location and configuration of a system that delivers the services.

A data center is a facility used to house computer systems and associated components, such as telecommunication systems and storage systems. A data center generally includes redundant or backup power supplies, redundant data communications connections, environmental controls (e.g., air conditioning, fire suppression, etc.), and/or security devices. In one example, a data center may share information with a cloud computing environment that may be utilized by client devices.

A cloud device, in a cloud computing environment, may communicate traffic with other cloud devices, in the cloud computing environment or in other cloud computing environments, via a centralized forwarding and/or switching device, such as a router. However, the centralized forwarding/switching device may become a bottleneck when traffic communicated among the cloud devices increases to a certain level.

Furthermore, a cloud device may utilize a virtual machine (VM) that includes a software implementation of a machine (e.g., a computer) for executing a program like a physical machine. In one example, the virtual machine may utilize one or two ports to communicate traffic with other cloud devices. However, the port(s) may have a limited bandwidth, where half of the bandwidth may be used for ingress traffic and the other half of the bandwidth may be used for egress traffic. The limited bandwidth may become a bottleneck when traffic communicated among the cloud devices increases to a certain level.

DETAILED DESCRIPTION OF PREFERRED EMBODIMENTS

The following detailed description refers to the accompanying drawings. The same reference numbers in different drawings may identify the same or similar elements.

Systems and/or methods described herein may provide a distributed fabric architecture in a cloud computing environment. In one example, the systems and/or methods may incorporate forwarding and/or switching functionality in a virtual machine of each cloud device provided in one or more cloud computing environments. The forwarding/switching functionality may mitigate or eliminate bandwidth and/or scalability issues experienced by the cloud computing environments. The forwarding/switching functionality may enable broadcast and/or multicast traffic to be communicated among the cloud devices.

Figure 1:
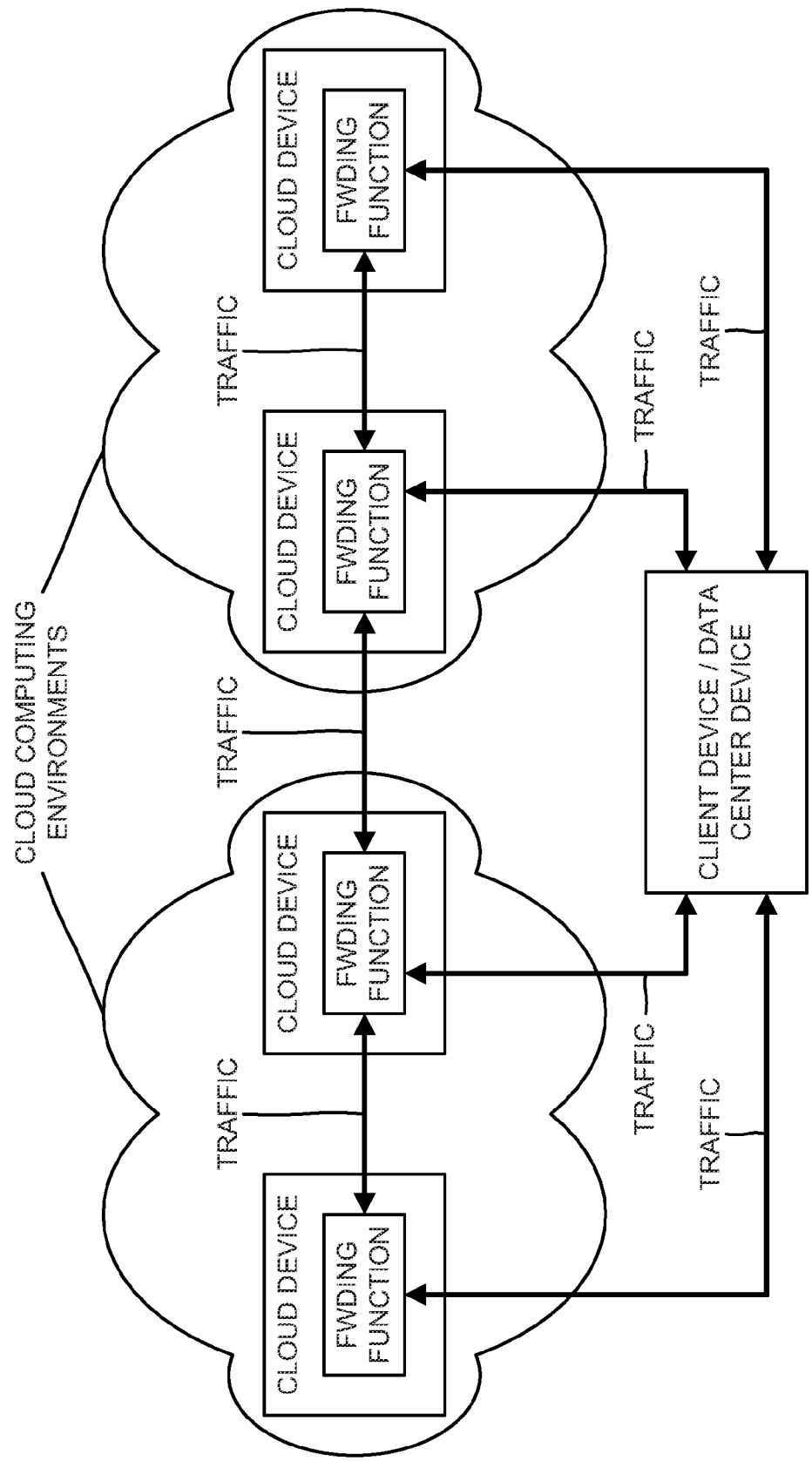
FIG. 1 is a diagram of an overview of an example implementation described herein.

FIG. 1 is a diagram of an overview of an example implementation described herein. As shown, cloud computing environments may include cloud devices that may communicate with a client device and/or a data center device. Each cloud computing environment may include an environment that delivers computing as a service, whereby shared resources, services, user objects, etc. may be provided to the client device and/or the data center device as a utility over a network. Each cloud computing environment may provide computation, software, data access, and/or storage services that do not require end-user (e.g., the client device and/or the data center device) knowledge of a physical location and configuration of system(s) and/or device(s) that deliver the services.

Each cloud device may include one or more server devices, or other types of computation and communication devices, that provide cloud resources, cloud services, cloud user objects, etc. to the client device and/or the data center device as a utility over a network. The data center device may include one or more server devices, or other types of computation and communication devices, that receive shared resources, services, user objects, etc. from the cloud computing environments and/or the cloud devices. The client device may include a computation and communication device, such as radiotelephone, a personal communications system (PCS) terminal, a smart phone; a personal digital assistant (PDA), a laptop computer, a tablet computer, a desktop computer, a workstation computer, etc.

As further shown in FIG. 1, each cloud device may provide a forwarding function. In one example, each cloud device may establish the forwarding function in a virtual machine of the cloud device. The forwarding function may enable a cloud device to perform routing, switching, traffic shaping, encrypting, etc. functionality. In one example, the switching functionality may include a switching specific subset of forwarding functions that operate on frames. The routing functionality may include a routing specific subset of forwarding functions that operate on packets. The forwarding function may enable a cloud device, of a particular cloud computing environment, to communicate traffic with other cloud devices of the particular cloud computing environment. The forwarding function may also enable the cloud device, of the particular cloud computing environment, to communicate traffic with cloud devices of other cloud computing environments. The cloud devices may also utilize the forwarding function to communicate traffic with the client device and/or the data center device. Thus, as further shown in FIG. 1, a cloud device of a particular cloud computing environment may, via the forwarding function, route traffic to/from cloud devices in the particular cloud computing environment; traffic to/from cloud devices in the other cloud computing environment; and traffic to/from the client device, and/or the data center device.

As used herein, the term "user" is intended to be broadly interpreted to include a client device, or a user of a client device.

The term "component," as used herein, is intended to be broadly construed to include hardware (e.g., a processor, a microprocessor, an application-specific integrated circuit (ASIC), a field-programmable gate array (FPGA), a chip, a memory device (e.g., a read only memory (ROM), a random access memory (RAM), etc.), etc.) or a combination of hardware and software (e.g., a processor, microprocessor, ASIC, etc. executing software contained in a memory device).

Figure 2:
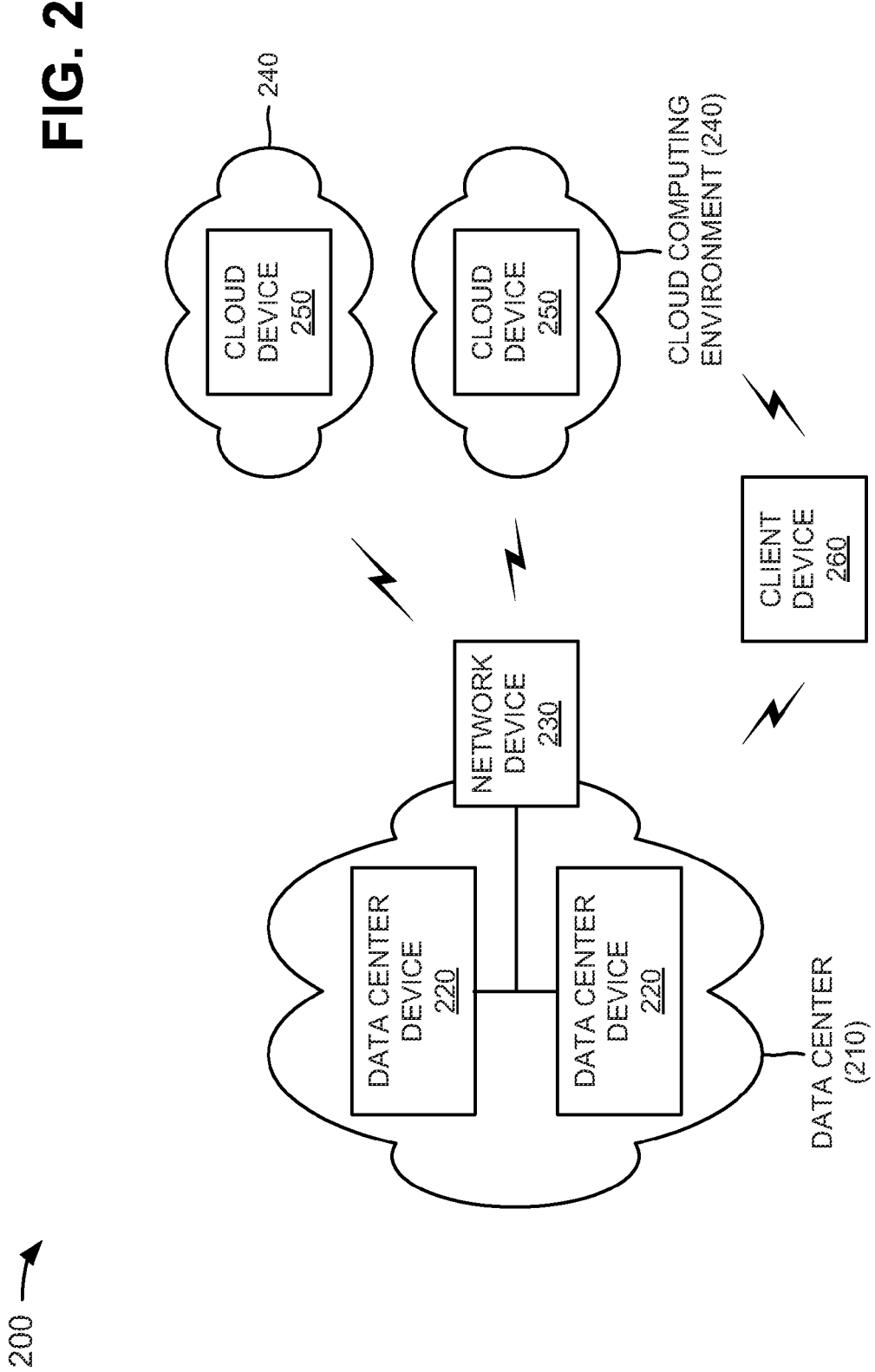
FIG. 2 is a diagram of an example network in which systems and/or methods described herein may be implemented.

FIG. 2 is a diagram of an example network 200 in which systems and/or methods described herein may be implemented. As illustrated, network 200 may include a data center 210 that includes data center devices 220 and a network device 230; cloud computing environments 240 that include cloud devices 250; and a client device 260. Devices and/or environments of network 200 may interconnect via wired and/or wireless connections. One data center 210, two data center devices 220, one network device 230, two cloud computing environments 240, two cloud devices 250, and one client device 260 have been illustrated in FIG. 2 for simplicity. In practice, there may be more data centers 210, data center devices 220, network devices 230, cloud computing environments 240, cloud devices 250, and/or client devices 260.

Data center 210 may include one or more facilities and/or one or more networks with computer systems, server devices, and associated components, such as telecommunications and storage systems. Data center 210 may include redundant or backup power supplies, redundant data communications connections, environmental controls, security devices, etc. In one example, data center 210 may share information, with cloud computing environment 240, which may be utilized by client device 260. Data center 210 may include resources, such as a device (e.g., a network device, a server, a computer system, etc.), data (e.g., availability information, license information, etc.), a service (e.g., a load balancing service, network information collection, etc.), etc.

Data center device 220 may include one or more server devices, or other types of computation and communication devices, that gather, process, search, and/or provide information in a manner described herein. In one example implementation, data center device 220 may receive shared resources, services, user objects, etc. from cloud computing environments 240 and/or cloud devices 250.

Network device 230 may include a gateway, a router, a switch, a firewall, a network interface card (NIC), a hub, a bridge, a proxy server, a multiplexer, or some other type of device that processes and/or transfers traffic. In one example implementation, network device 230 may include a firewall that creates encrypted tunnels with cloud devices 250 so that secure data paths may be provided between data center devices 220 and cloud devices 250.

Cloud computing environment 240 may include an environment that delivers computing as a service, whereby shared resources, services, user objects, etc. may be provided to data center device 220 and/or client device 260 as a utility over a network. Cloud computing environment 240 may provide computation, software, data access, and/or storage services that do not require end-user (e.g., data center device 220 and/or client device 260) knowledge of a physical location and configuration of system(s) and/or device(s) that deliver the services. In one implementation, cloud computing environment 240 may include a data center similar to data center 110.

Cloud device 250 may include one or more server devices, or other types of computation and communication devices, that gather, process, search, and/or provide information in a manner described herein. In one example implementation, cloud device 250 may provide cloud resources, cloud services, cloud user objects, etc. to data center device 220 and/or client device 260 as a utility over a network.

The cloud resources may include a compute instance executing in cloud device 250, a storage device provided in cloud device 250, a data transfer operation executed by cloud device 250, etc. The cloud services may include a virtual machine executing in cloud device 250, a virtual tunnel provided between network device 230 and cloud device 250, etc. The cloud user objects may include a server (e.g., a virtual machine of cloud device 250) that is managed by data center device 220.

Client device 260 may include a radiotelephone; a personal communications system (PCS) terminal that may combine, for example, a cellular radiotelephone with data processing and data communications capabilities; a smart phone; a personal digital assistant (PDA) that can include a radiotelephone, a pager, Internet/intranet access, etc.; a laptop computer; a tablet computer; a desktop computer; a workstation computer; or other types of computation and communication devices.

Although FIG. 2 shows example devices/networks of network 200, in other implementations, network 200 may include fewer devices/networks, different devices/networks, differently arranged devices/networks, or additional devices/networks than depicted in FIG. 2. Alternatively, or additionally, one or more devices/networks of network 200 may perform one or more tasks described as being performed by one or more other devices/networks of network 200.

Figure 3:
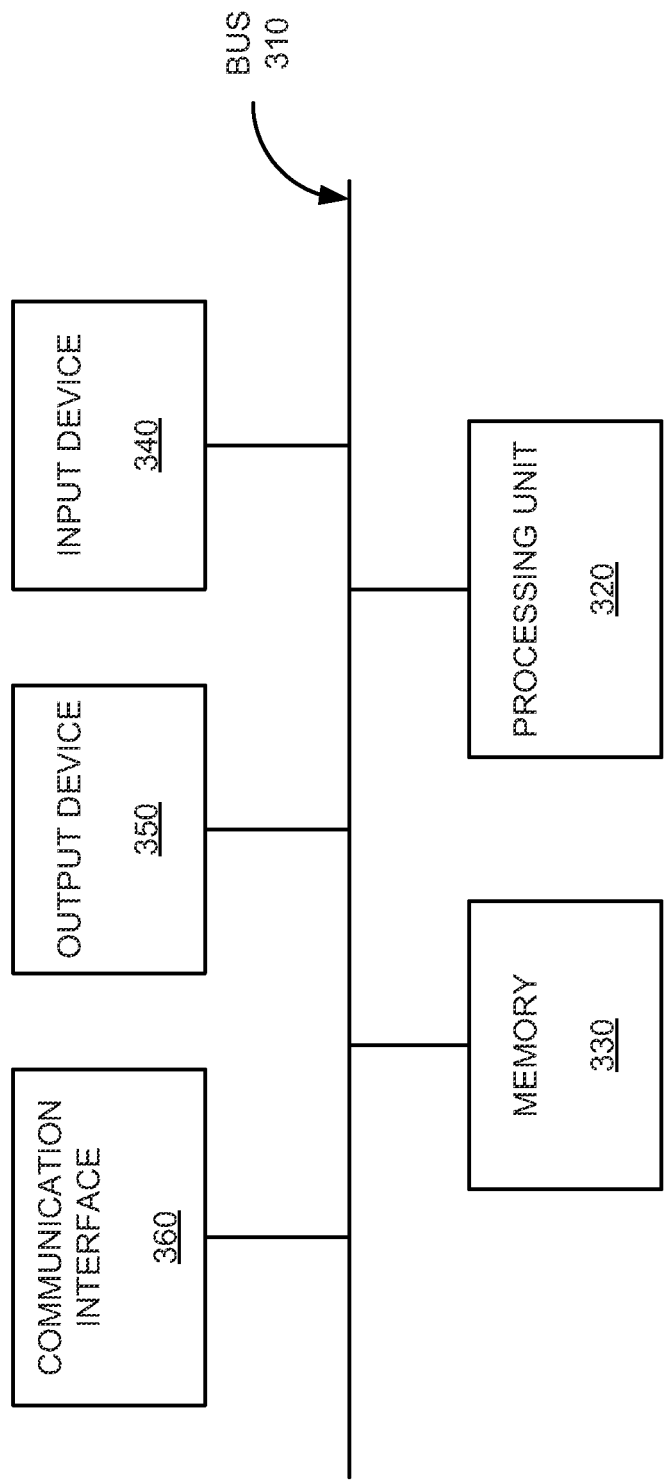
FIG. 3 is a diagram of example components of a device that may correspond to one of the devices of the network depicted in FIG. 2.

FIG. 3 is a diagram of example components of a device 300 that may correspond to one or more devices of network 200 (FIG. 1). In one example implementation, one or more of the devices of network 200 may include one or more devices 300 or one or more components of device 300. As illustrated in FIG. 3, device 300 may include a bus 310, a processing unit 320, a memory 330, an input device 340, an output device 350, and a communication interface 360.

Bus 310 may permit communication among the components of device 300. Processing unit 320 may include one or more processors or microprocessors that interpret and execute instructions. In other implementations, processing unit 320 may be implemented as or include one or more ASICs, FPGAs, or the like.

Memory 330 may include a RAM or another type of dynamic storage device that stores information and instructions for execution by processing unit 320, a ROM or another type of static storage device that stores static information and instructions for the processing unit 320, and/or some other type of magnetic or optical recording medium and its corresponding drive for storing information and/or instructions.

Input device 340 may include a device that permits an operator to input information to device 300, such as a keyboard, a keypad, a mouse, a pen, a microphone, a touch screen display, one or more biometric mechanisms, and the like. Output device 350 may include a device that outputs information to the operator, such as a display, a speaker, etc.

Communication interface 360 may include any transceiver-like mechanism that enables device 300 to communicate with other devices and/or systems. For example, communication interface 360 may include mechanisms for communicating with other devices, such as other devices of network 200.

As described herein, device 300 may perform certain operations in response to processing unit 320 executing software instructions contained in a computer-readable medium, such as memory 330. A computer-readable medium may be defined as a non-transitory memory device. A memory device may include space within a single physical memory device or spread across multiple physical memory devices. The software instructions may be read into memory 330 from another computer-readable medium or from another device via communication interface 360. The software instructions contained in memory 330 may cause processing unit 320 to perform processes described herein. Alternatively, or additionally, hardwired circuitry may be used in place of or in combination with software instructions to implement processes described herein. Thus, implementations described herein are not limited to any specific combination of hardware circuitry and software.

Although FIG. 3 shows example components of device 300, in other implementations, device 300 may include fewer components, different components, differently arranged components, or additional components than depicted in FIG. 3. Alternatively, or additionally, one or more components of device 300 may perform one or more tasks described as being performed by one or more other components of device 300.

Figure 4:
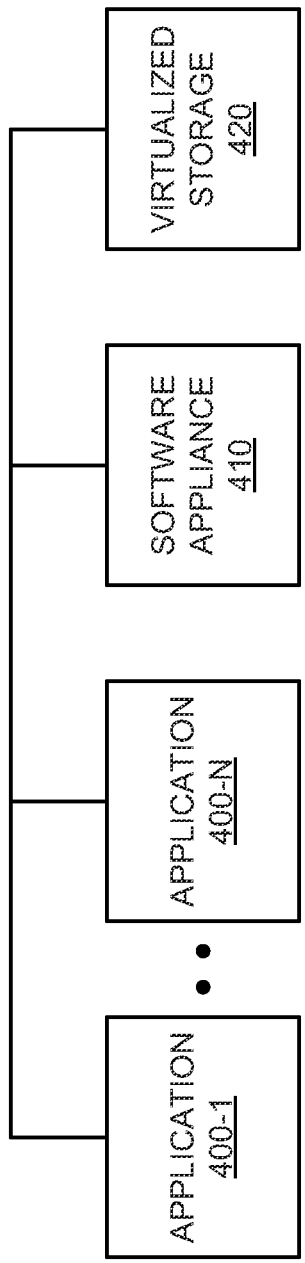
FIG. 4 is a diagram of example functional components of a data center device of FIG. 2.

FIG. 4 is a diagram of example functional components of data center device 220. In one implementation, the functions described in connection with FIG. 4 may be performed by one or more components of device 300 (FIG. 3) or by one or more devices 300. As shown in FIG. 4, data center device 220 may include multiple applications 400-1 through 400-N (collectively referred to herein as "applications 400," and, in some instances, singularly as "application 400"), a software appliance 410, and virtualized storage 420.

Applications 400 may include one or more software applications, available at data center device 220, which may depend upon the function assigned to data center device 220. For example, applications 400 may include software that handles core business and operational data of an organization, enterprise software, telecommunications software, etc. Applications 400 may be designed for execution by multiple host devices, where each host device may execute a single component. In one example, components of applications 400 may include databases, file servers, application servers, middleware, etc.

Software appliance 410 may securely bridge data center device 220 with cloud computing services provided by cloud computing environment 240. Software appliance 410 may extend data center 210 security and control into cloud computing environment 240. This may allow applications 400 to remain integrated with data center 210 tools and policies and to be managed as if applications 400 were executing locally at client device 260. Software appliance 410 may move applications 400 between data center 210 and cloud computing environment 240 based on requirements of an organization. In one example, software appliance 410 may include management components for discovering applications 400, orchestrating cloud deployments, and/or managing cloud utilization. Software appliance 410 may create a secure data path to bridge network connectivity between data center 210 and a chosen provider of cloud computing environment 240. In one example implementation, data center device 220 may utilize multiple software appliances 210 for availability and scaling purposes.

Virtualized storage 420 may include one or more storage systems and/or one or more devices that use virtualization techniques to enable better functionality and more advanced features within the storage systems and/or the devices of data center device 220. In one example, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system greater flexibility in how they manage storage for end users. File virtualization may eliminate dependencies between data accessed at a file level and a location where files are physically stored. This may enable optimization of storage use, server consolidation, and/or performance of non-disruptive file migrations.

Although FIG. 4 shows example functional components of data center device 220, in other implementations, data center device 220 may include fewer functional components, different functional components, differently arranged functional components, or additional functional components than depicted in FIG. 4. Additionally, or alternatively, one or more functional components of data center device 220 may perform one or more tasks described as being performed by one or more other functional components of data center device 220.

Figure 5:
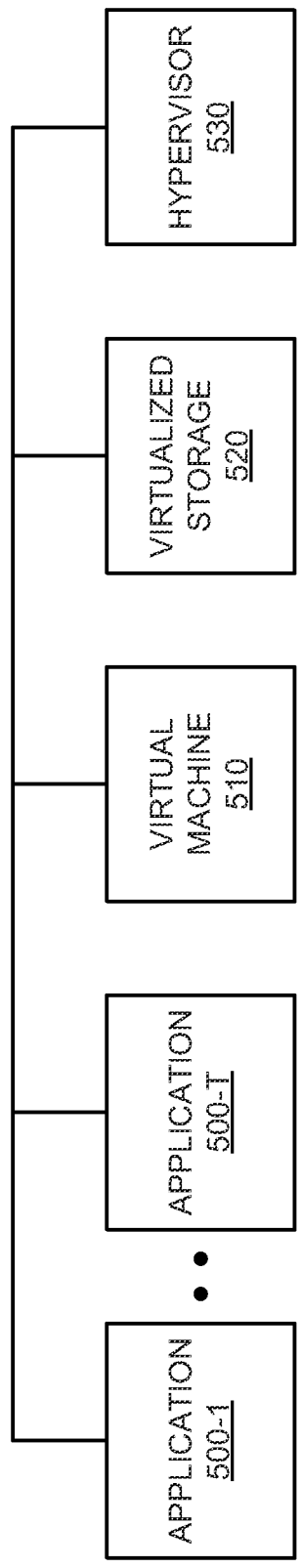
FIG. 5 is a diagram of example functional components of a cloud device of FIG. 2.

FIG. 5 is a diagram of example functional components of cloud device 250. In one implementation, the functions described in connection with FIG. 5 may be performed by one or more components of device 300 (FIG. 3) or by one or more devices 300. As shown in FIG. 5, cloud device 250 may include multiple applications 500-1 through 500-T (collectively referred to herein as "applications 500," and, in some instances, singularly as "application 500"), a virtual machine 510, virtualized storage 520, and a hypervisor 530.

Applications 500 may include one or more software applications that may be provided to or accessed by client device 260. Applications 500 may eliminate a need to install and execute the software applications on client device 260. For example, applications 500 may include word processing software, database software, content, monitoring software, financial software, communication software, and/or any other software capable of being provided via cloud computing environment 240. In one example implementation, one application 500 may communicate information (e.g., traffic) with one or more other applications 500, via virtual machine 510.

Virtual machine (VM) 510 may include a software implementation of a machine (e.g., a computer) that executes programs like a physical machine. Virtual machine 510 may be either a system virtual machine or a process virtual machine, depending upon use and degree of correspondence to any real machine by virtual machine 510. A system virtual machine may provide a complete system platform that supports execution of a complete operating system (OS). A process virtual machine may execute a single program, and may support a single process. In one example implementation, virtual machine 510 may execute on behalf of a data center 210 user (e.g., client device 260), and may manage infrastructure of cloud computing environment 240, such as data management, synchronization, and long-duration data transfers. Virtual machine 510 may provide encryption services for network and storage utilization to ensure that cloud computing environment providers do not have access to data center 210 network or storage communications.

Virtualized storage 520 may include one or more storage systems and/or one or more devices that use virtualization techniques to enable better functionality and more advanced features within the storage systems or devices of cloud device 250. In one example, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system greater flexibility in how they manage storage for end users. File virtualization may eliminate dependencies between data accessed at a file level and a location where files are physically stored. This may enable optimization of storage use, server consolidation, and/or performance of non-disruptive file migrations.

Hypervisor 530 may provide hardware virtualization techniques that allow multiple operating systems (e.g., "guest operating systems") to execute concurrently on a host computer. Hypervisor 530 may present to the guest operating systems a virtual operating platform, and may manage the execution of the guest operating systems. Multiple instances of a variety of operating systems may share virtualized hardware resources. Hypervisor 530 may provide an interface to infrastructure as a service (IaaS) provided by cloud computing environment 240.

Although FIG. 5 shows example functional components of cloud device 250, in other implementations, cloud device 250 may include fewer functional components, different functional components, differently arranged functional components, or additional functional components than depicted in FIG. 5. Additionally, or alternatively, one or more functional components of cloud device 250 may perform one or more tasks described as being performed by one or more other functional components of cloud device 250.

Figure 6:
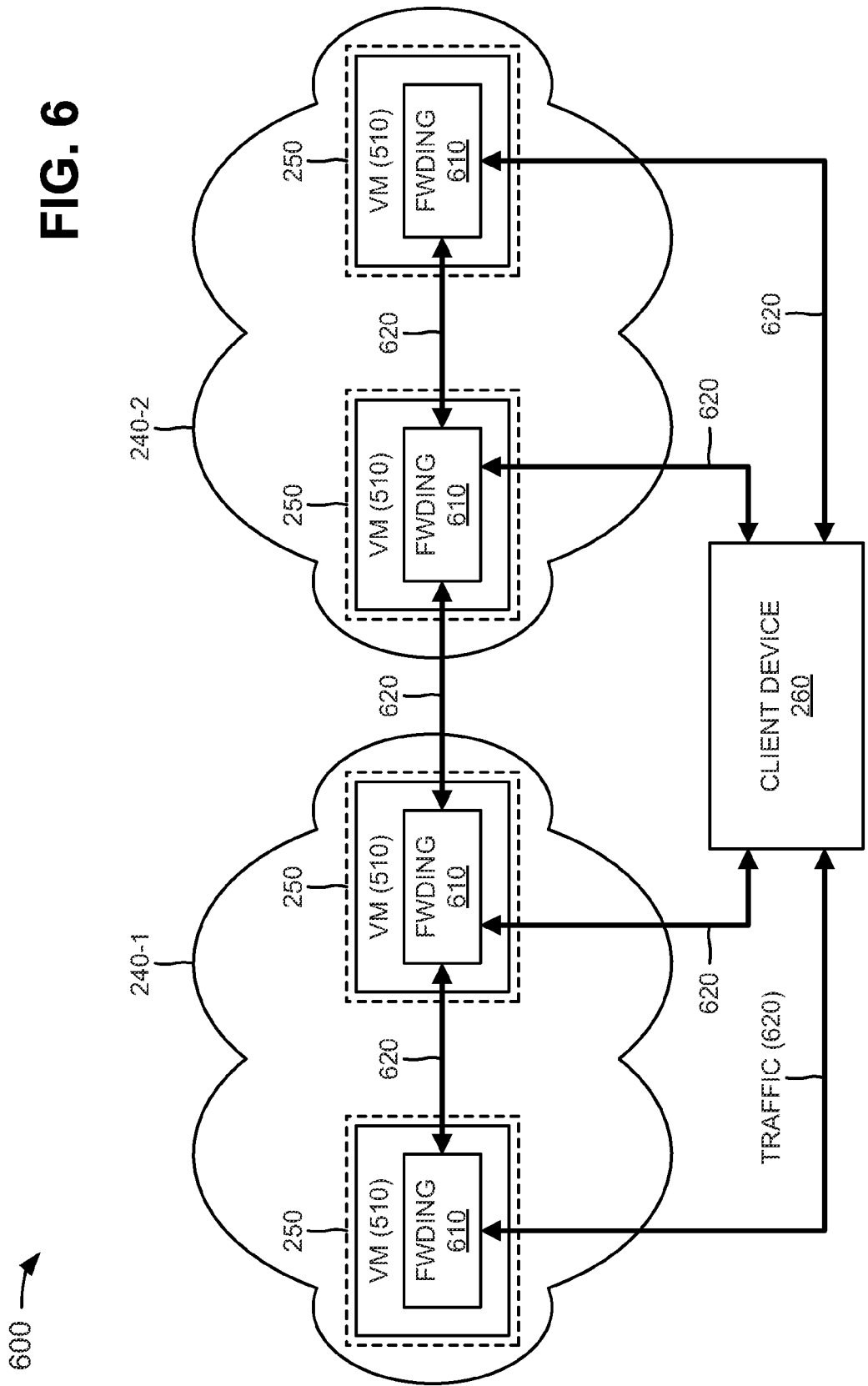
FIG. 6 is a diagram of example operations capable of being performed by an example portion of the network depicted in FIG. 2.

FIG. 6 is a diagram of example operations capable of being performed by an example portion 600 of network 200 (FIG. 2). As shown, example network portion 600 may include cloud computing environments 240-1 and 240-2, cloud devices 250, client device 260, and virtual machines 510. Cloud computing environments 240-1 and 240-2, cloud devices 250, client device 260, and virtual machines 510 may include the features described above in connection with, for example, one or more of FIGS. 2, 3, and 5. As further shown in FIG. 6, each of virtual machines 510 may include a forwarding function 610.

Forwarding function 610 may implement some or all forwarding functions, and may mitigate or eliminate bandwidth and/or scalability issues experienced by cloud computing environments 240. Forwarding function 610 may enable broadcast and/or multicast traffic to be communicated among cloud devices 250, as described in more detail below in connection with FIG. 9. Forwarding function 610 may include a local forwarding function, referred to herein as a virtual end point (VEP), that enables cloud device 250, of cloud computing environment 240-1, to communicate traffic 620 with other cloud devices 250 of cloud computing environment 240-1. The local forwarding function may also enable cloud device 250, of cloud computing environment 240-2, to communicate traffic 620 with other cloud devices 250 of cloud computing environment 240-2. The term traffic, as used herein, is intended to be broadly construed to include a frame, a datagram, a packet, or a cell; a fragment of a frame, a fragment of a datagram, a fragment of a packet, or a fragment of a cell; a stream of frames, datagrams, packets, cells, etc.; or another type, arrangement, or packaging of data. A frame may typically be associated with switching operations and may or may not include virtual LAN (VLAN tags). In one example, a frame may include a payload (e.g., an Ethernet frame payload that includes Internet protocol (IP)/transmission control protocol (TCP) headers and user data). A packet may typically be associated with routing operations and/or one or more protocols (e.g., the IP version 6 (IPv6) protocol, the TCP, the user datagram protocol (UDP), etc.). In one example, a packet may include data and a header that provides a protocol specific descriptor. Traffic 620 communicated among cloud devices 250 of a common cloud computing environment 240 may be referred to herein as local trunk traffic.

The local forwarding function may perform reframing of the local trunk traffic in accordance with network address translation (NAT) procedures so that the local trunk traffic may be quickly routed to an appropriate destination. With regard to egress Internet protocol (IP) local trunk traffic, the local forwarding function may strip virtual LAN (VLAN) information from the traffic and may add a private tag for source and destination ports. With regard to ingress IP local trunk traffic, the local forwarding function may add VLAN information and may use the private tag for source and destination ports. The local forwarding function may perform trunk framing, for full encapsulation, on egress layer 2 (L2) local trunk traffic, and may remove trunk framing from ingress L2 local trunk traffic.

In one example implementation, the local forwarding function may map physical network information, associated with the local trunk traffic, to virtual network information. For example, the local forwarding function may map private IP local trunk traffic with a particular physical header, e.g., {media access control (MAC) address, VLAN, IP address, protocol, port}, to traffic with a particular virtual header, e.g., {IP address, port}. The local forwarding function may map private local trunk traffic to public local trunk traffic, and vice versa. For egress IP local trunk traffic, the local forwarding function may map a destination VLAN, destination IP address, and destination IP port associated with application 500 to a destination IP address and port of virtual machine 510. For ingress IP local trunk traffic, the local forwarding function may map a destination IP address and port of virtual machine 510 to a destination VLAN, destination IP address, and destination IP port associated with application 500. For egress L2 local trunk traffic, the local forwarding function may map a destination MAC address and a VLAN associated with application 500 to a destination IP address and port of virtual machine 510. For ingress L2 local trunk traffic, the local forwarding function may map a destination IP address and port of virtual machine 510 to an Ethernet port and a VLAN associated with application 500.

The local forwarding function may enable cloud devices 250 to communicate traffic 620 with client device 260 and/or data center device 220 (not shown in FIG. 6). Traffic 620 communicated between cloud devices 250 and client device 260 or data center device 220 may be referred to herein as access traffic. The local forwarding function may perform reframing of the access traffic in accordance with NAT procedures so that the access traffic may be quickly routed to an appropriate destination. In one example implementation, the local forwarding function may map physical network information, associated with the access traffic, to virtual network information. For example, the local forwarding function may map private access traffic with a particular physical header, e.g., {MAC address, VLAN, IP address, protocol, port}, to traffic with a particular virtual header, e.g., {protocol, port}. Alternatively, or additionally, the local forwarding function may map public access traffic with a particular physical header, e.g., {MAC address, IP address, protocol, port}, to traffic with a particular virtual header, e.g., {protocol, port}. The local forwarding function may map private access traffic to public access traffic, and vice versa, utilizing NAT procedures and in order to provide ingress access control. The local forwarding function may perform traffic engineering on the access traffic, such as guaranteeing a committed information rate (CIR) or a peak information rate (PIR) for the access traffic.

Forwarding function 610 may include a global forwarding function, referred to herein as a virtual border element (VBE), that enables cloud device 250, of cloud computing environment 240-1, to communicate traffic 620 with cloud devices 250 of other cloud computing environments 240, such as cloud computing environment 240-2. The global forwarding function may also enable cloud device 250, of cloud computing environment 240-2, to communicate traffic 620 with cloud devices 250 of other cloud computing environments 240, such as cloud computing environment 240-1. Traffic 620 communicated among cloud devices 250 of different cloud computing environments 240 may be referred to herein as global trunk traffic.

The global forwarding function may perform reframing of the global trunk traffic in accordance with NAT procedures so that the global trunk traffic may be quickly routed to an appropriate destination. In one example implementation, the global forwarding function may map physical network information, associated with the global trunk traffic, to virtual network information. For example, the global forwarding function may map private global trunk traffic with a particular physical header, e.g., {MAC address, VLAN, IP address, protocol, port}, to traffic with a particular virtual header, e.g., {IP address, port}. Alternatively, or additionally, the global forwarding function may map public global trunk traffic with a particular physical header, e.g., {MAC address, IP address, protocol, port}, to traffic with a particular virtual header, e.g., {IP address, port}. The global forwarding function may map private global trunk traffic to public global trunk traffic, and vice versa, utilizing NAT procedures.

In one example implementation, forwarding function 610 may provide rule-based access control functionality, lookup functionality, reframing functionality, traffic engineering functionality, actual forwarding functionality, encryption functionality, etc. The rule-based access control functionality may include using a set of rules to determine whether a particular frame/packet is permitted for admission (e.g., firewall filtering and/or other types of traffic filtering). The lookup functionality may include associating one or more fields from frame/packet headers with forwarding instructions (e.g., find a destination UDP port using an Ethernet VLAN tag, drop a frame based on a source media access control (MAC) address, treat a packet using local trunk rules, etc.). The reframing functionality may include adding, removing, and/or replacing one or more fields in a frame/packet (e.g., remove a VLAN tag from an Ethernet header, replace a current destination port number in a UDP header with lookup results, etc.). The traffic engineering functionality may include traffic shaping for enforcing a Committed Information Rate (CIR) and/or a Peak Information Rate (PIR), traffic metering for billing and statistical purposes, etc. The actual forwarding functionality may include delivering a frame/packet to an appropriate output or output queue. The encryption functionality may include performing encryption or decryption on traffic.

Although FIG. 6 shows example operations capable of being performed by components of example network portion 600, in other implementations, example network portion 600 may include fewer components, different components, differently arranged components, or additional components than depicted in FIG. 6. Additionally, or alternatively, one or more components of example network portion 600 may perform one or more tasks described as being performed by one or more other components of example network portion 600.

Figure 7:
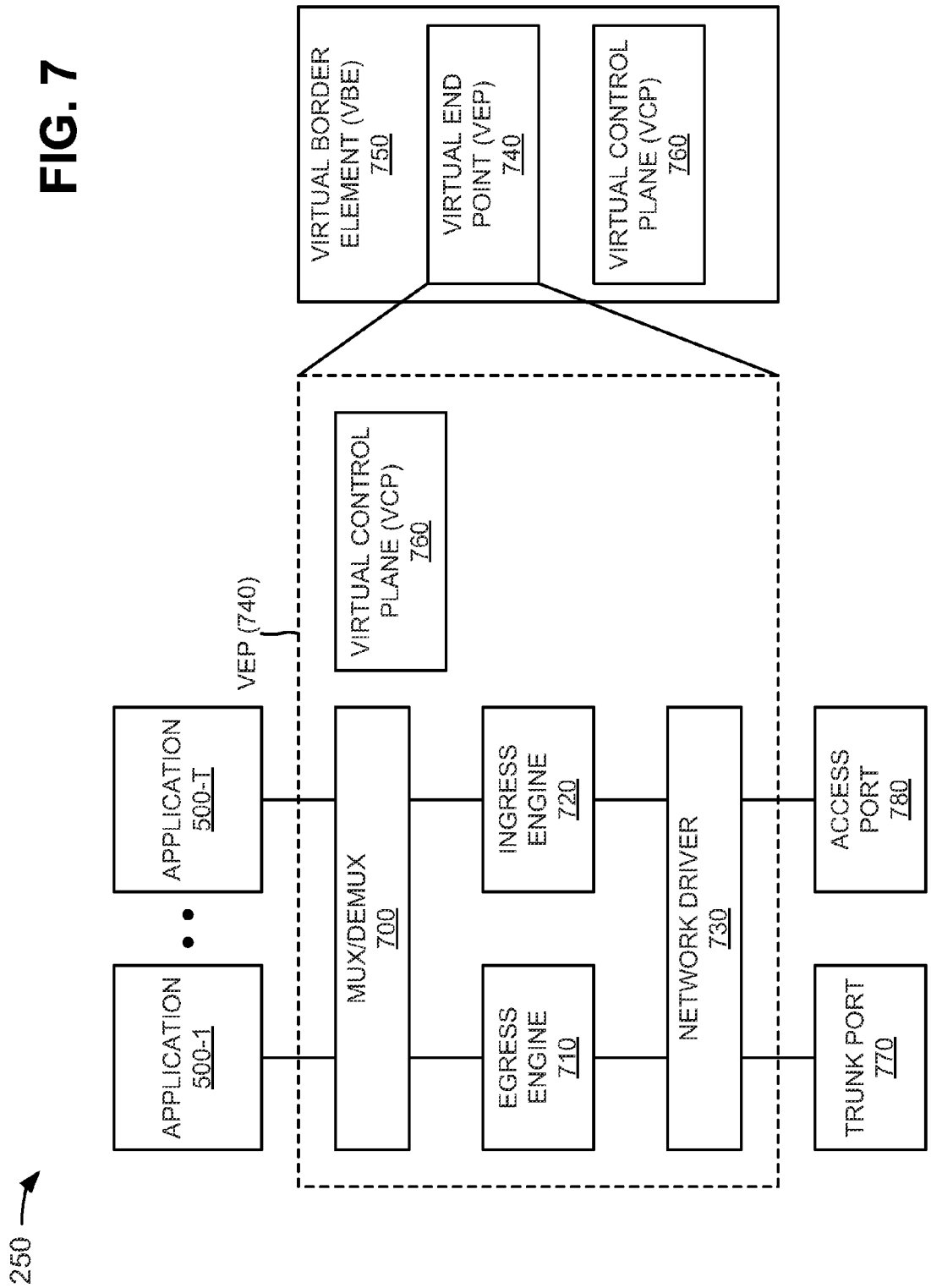
FIG. 7 is a diagram of additional example functional components of the cloud device.

FIG. 7 is a diagram of additional example functional components of cloud device 250. In one implementation, the functions described in connection with FIG. 7 may be performed by one or more components of device 300 (FIG. 3) or by one or more devices 300. As shown in FIG. 7, cloud device 250 may include applications 500. Cloud device 250 and applications 500 may include the features described above in connection with, for example, one or more of FIGS. 2, 3, 5, and 6. As further shown in FIG. 7, cloud device 250 may include a multiplexor/demultiplexor 700, an egress engine 710, an ingress engine 720, a network driver 730, a virtual end point (VEP) 740, a virtual border element (VBE) 750, and a virtual control plane (VCP) 760. In one example implementation, multiplexor/demultiplexor 700, egress engine 710, ingress engine 720, network driver 730, VEP 740, VBE 750, and VCP 760 may correspond to forwarding function 610 (FIG. 6). VEP 740 may include multiplexor/demultiplexor 700, egress engine 710, ingress engine 720, network driver 730, and/or VCP 760, and may be associated with a trunk port 770 and an access port 780. VBE 750 may include VEP 740 and/or VCP 760.

Multiplexor/demultiplexor 700 may aggregate or demultiplex traffic received by cloud device 250, and may provide the aggregated or demultiplexed traffic to one or more applications 500. Alternatively, or additionally, multiplexor/demultiplexor 700 may receive traffic from one more applications 500, may aggregate or demultiplex the traffic, and may provide the aggregated or demultiplexed traffic to data center device 220, another cloud device 250, and/or client device 260.

Egress engine 710 may receive egress traffic destined for data center device 220, another cloud device 250, and/or client device 260, and may perform reframing of the egress traffic in accordance with NAT procedures so that the egress traffic may be quickly routed to an appropriate destination. Egress engine 710 may provide the reframed egress traffic to network driver 730 for forwarding to a destination via trunk port 770 and/or access port 780. In one example, the egress traffic may be provided to egress engine 710 by one or more applications 500, via multiplexor/demultiplexor 700. In one example, egress engine 710 may include a forwarding engine that implements an egress set of forwarding functions.

Ingress engine 720 may receive ingress traffic received by cloud device 250, and may perform reframing of the ingress traffic in accordance with the NAT procedures so that the ingress traffic may be quickly routed to an appropriate destination. Ingress engine 720 may provide the reframed ingress traffic to one or more applications 500 via multiplexor/demultiplexor 700. In one example, ingress engine 720 may include a forwarding engine that implements an ingress set of forwarding functions.

Network driver 730 may enable cloud device 250 to communicate with network devices, such as data center device 220, another cloud device 250, and/or client device 260, via trunk port 770 and/or access port 780. Network driver 730 may receive traffic from trunk port 770 and/or access port 780, and may forward the traffic to ingress engine 720. Network driver 730 may receive traffic from egress engine 710, and may forward the traffic to a destination via trunk port 770 and/or access port 780.

VEP 740 may enable cloud device 250 to communicate local trunk traffic with other cloud devices 250 of a common cloud computing environment 240 (not shown in FIG. 7). VEP 740 may enable the local trunk traffic to be communicated via trunk port 770. VEP 740 may enable cloud device 250 to communicate access traffic with data center device 220 and/or client device 260. VEP 740 may enable the access traffic to be communicated via access port 780. VEP 740 may perform the functionality of the local forwarding function (e.g., of forwarding function 610) described above in connection with FIG. 6. In one example implementation, VEP 740 may control the functionality of multiplexor/demultiplexor 700, egress engine 710, ingress engine 720, and/or network driver 730.

VBE 750 may enable cloud device 250 to communicate global trunk traffic with cloud devices 250 of other cloud computing environments 240. VBE 750 may enable the global trunk traffic to be communicated via trunk port 770. In one example, VBE 750 may perform the functionality of the global forwarding function (e.g., of forwarding function 610) described above in connection with FIG. 6. VBE 750 may interconnect dissimilar cloud computing environments 240, and may provide a bridge for L2 and Layer 3 (L3) broadcast regions in the dissimilar cloud computing environments 240. VBE 750 may map local trunk ports onto global trunk ports, and may map global trunk ports onto local trunk ports. Alternatively, or additionally, VBE 750 may be used as a load balancing mechanism for cloud device 250. In one example implementation, VBE 750 may control the functionality of multiplexor/demultiplexor 700, egress engine 710, ingress engine 720, and/or network driver 730.

VCP 760 may control and manage the functionality associated with VEP 740 and VBE 750. VCP 760 may provision egress engine 710 and/or ingress engine 720 for transmitting and/or receiving traffic, and may generate alarms when VEP 740 or VBE 750 are not functioning properly. VCP 760 may ensure proper and coherent functioning of all VEPs 740 belonging to a cloud computing environment. VCP 760 may timely populate VEP 740 lookup tables, access rules, etc. based on a state of the cloud computing environment. VCP 760 may provide administrative control over all VEPs 740, may instantiate, delete, enable, and/or disable a CIR and/or a PIR based on a customer's profile, may report billing information, etc.

Trunk port 770 may include one or more ports that communicate local trunk traffic and/or global trunk traffic to and/or from cloud device 250. For example, trunk port 770 may communicate local trunk traffic between cloud device 250 and other cloud devices 250 of a common cloud computing environment 240. Alternatively, or additionally, trunk port 770 may communicate global trunk traffic between cloud device 250 and other cloud devices 250 of other cloud computing environments 240.

Access port 780 may include one or more ports that communicate access traffic to and/or from cloud device 250. For example, access port 780 may communicate access traffic between cloud device 250 and data center device 220. Alternatively, or additionally, access port 780 may communicate access traffic between cloud device 250 and client device 260. In one example implementation, cloud device 250 may include one or more network ports that are designated as trunk/access points. A trunk/access point may include a virtual component that communicates trunk traffic and/or access traffic to and/or from cloud device 250.

Although FIG. 7 shows example functional components of cloud device 250, in other implementations, cloud device 250 may include fewer functional components, different functional components, differently arranged functional components, or additional functional components than depicted in FIG. 7. Additionally, or alternatively, one or more functional components of cloud device 250 may perform one or more tasks described as being performed by one or more other functional components of cloud device 250.

Figure 8:
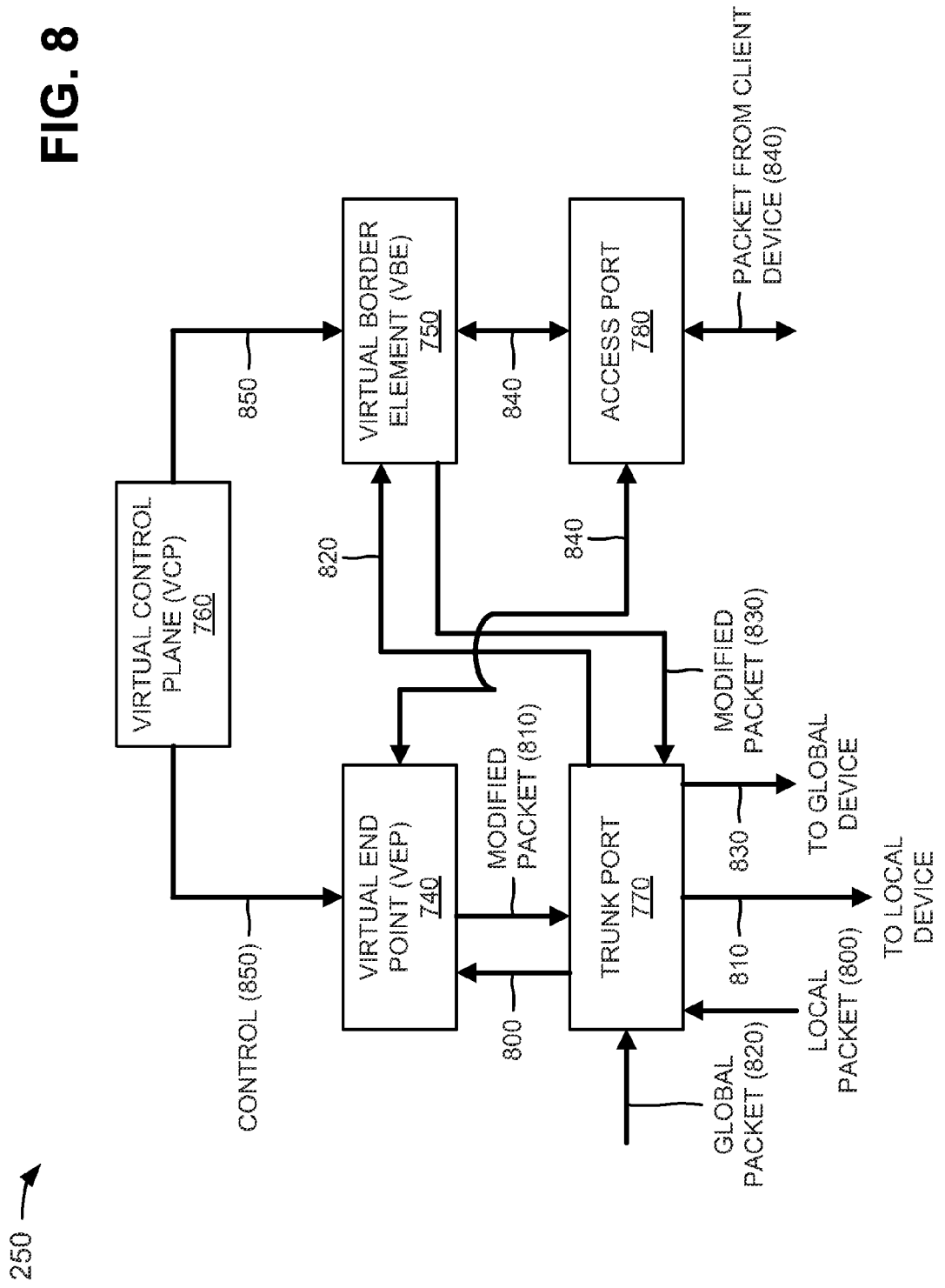
FIG. 8 is a diagram of example operations capable of being performed by the functional components of the cloud device.

FIG. 8 is a diagram of example operations capable of being performed by the functional components of cloud device 250. As shown in FIG. 8, cloud device 250 may include VEP 740, VBE 750, VCP 760, trunk port 770, and access port 780. Cloud device 250, VEP 740, VBE 750, VCP 760, trunk port 770, and access port 780 may include the features described above in connection with, for example, one or more of FIGS. 2, 3, and 5-7.

As further shown in FIG. 8, trunk port 770 may receive local trunk traffic, such as a local packet 800, from another cloud device 250 (e.g., a local cloud device 250) within the same cloud computing environment 240 as cloud device 250. Trunk port 800 may provide local packet 800 to VEP 740, and VEP 740 may receive local packet 800. VEP 740 may modify local packet 800 to include a destination of a particular cloud device 250 (e.g., a local cloud device 250) within the same cloud computing environment 240 as cloud device 250. In one example, VEP 740 may map a particular physical header, e.g., {MAC address, VLAN, IP address, protocol, port}, of local packet 800, to a particular virtual header, e.g., {IP address, port}, to create a modified local packet 810. VEP 740 may forward modified local packet 810 to trunk port 770, and trunk port 770 may forward modified local packet 810 to the particular cloud device 250 within the same cloud computing environment 240 as cloud device 250.

Trunk port 770 may receive global trunk traffic, such as a global packet 820, from another cloud device 250 (e.g., a global cloud device 250) within a different cloud computing environment 240 than cloud device 250. Trunk port 770 may provide global packet 820 to VBE 750, and VBE 750 may receive global packet 820. VBE 750 may modify global packet 820 to include a destination of a particular cloud device 250 (e.g., a global cloud device 250) within a different cloud computing environment 240 than cloud device 250. In one example, VBE 750 may map a particular physical header, e.g., {MAC address, VLAN, IP address, protocol, port}, of global packet 820, to a particular virtual header, e.g., {IP address, port}, to create a modified global packet 830. VBE 750 may forward modified global packet 830 to trunk port 770, and trunk port 770 may forward modified global packet 830 to the particular cloud device 250 within a different cloud computing environment 240 than cloud device 250.

As further shown in FIG. 8, access port 780 may receive access traffic, such as an access packet 840, from data center device 220 or client device 260. Access port 780 may forward access packet 840 to VEP 740 and/or VBE 750, depending on a destination of access packet 840. VEP 740 and/or VBE 750 may receive access packet 840, and may forward access packet to the destination, such as to one or more applications 500 (not shown in FIG. 8) of cloud device 250. VCP 760 may control operation of VEP 740 and VBE 750, as indicated by reference number 850. For example, VCP 760 may control how VEP 740 and/or VBE 750 handle local packet 800, global packet 820, and/or access packet 840.

Although FIG. 8 shows example operations capable of being performed by functional components of cloud device 250, in other implementations, cloud device 250 may include fewer functional components, different functional components, differently arranged functional components, or additional functional components than depicted in FIG. 8. Additionally, or alternatively, one or more functional components of cloud device 250 may perform one or more tasks described as being performed by one or more other functional components of cloud device 250.

Figure 9:
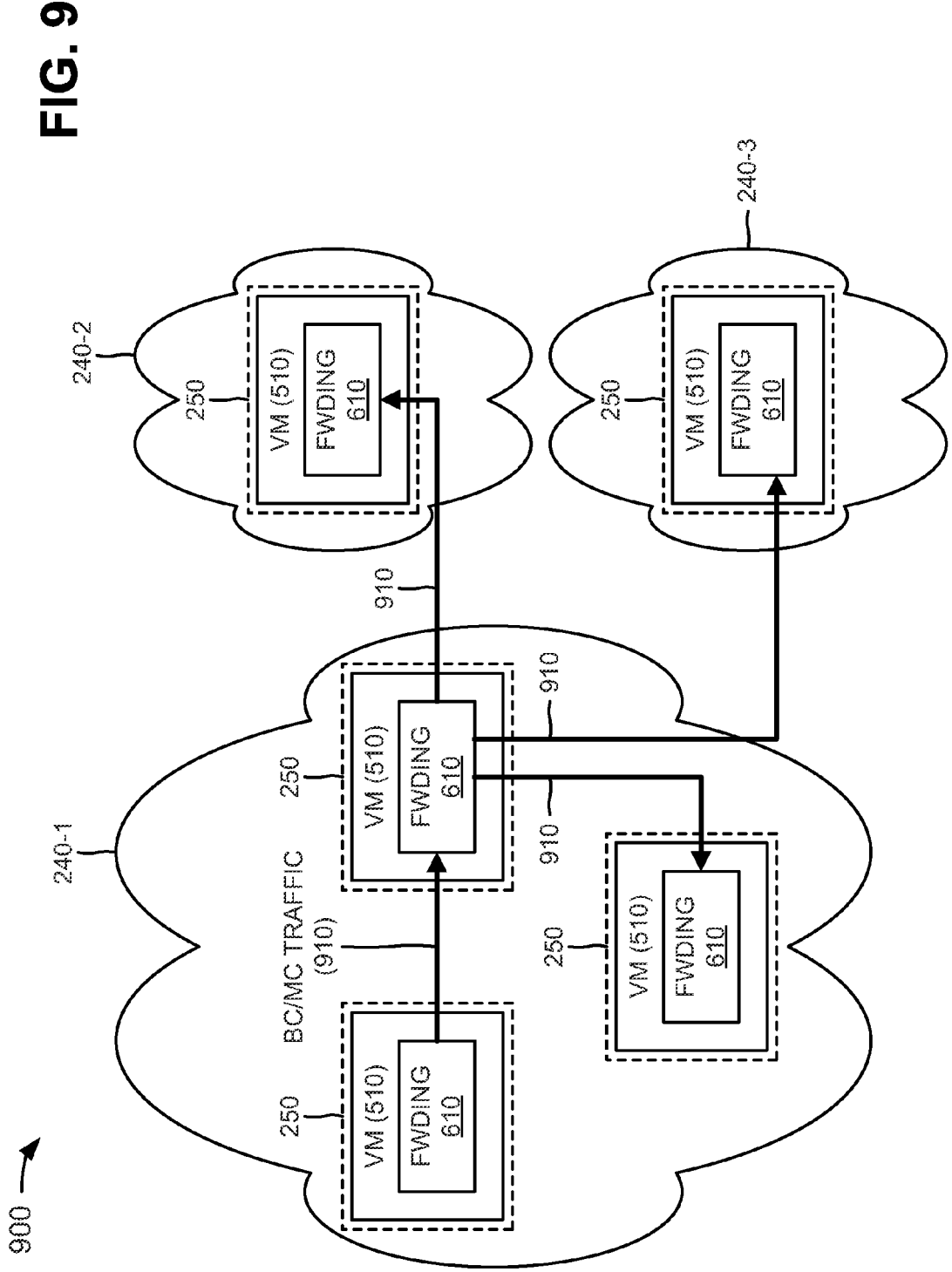
FIG. 9 is a diagram of example operations capable of being performed by an example portion of the network depicted in FIG. 2.

FIG. 9 is a diagram of example operations capable of being performed by an example portion 900 of network 200 (FIG. 2). As shown, example network portion 900 may include cloud computing environments 240-1 through 240-3, cloud devices 250, virtual machines 510, and forwarding functions 610. Cloud computing environments 240-1 through 240-3, cloud devices 250, virtual machines 510, and forwarding functions 610 may include the features described above in connection with, for example, one or more of FIGS. 2, 3, and 5-8.

As further shown in FIG. 9, forwarding function 610 of a cloud device 250 of cloud computing environment 240-1 may provide broadcast (BC) or multicast (MC) traffic 910 to a particular cloud device 250 of cloud computing environment 240-1. Alternatively, or additionally, broadcast/multicast traffic 910 may be provided to the particular cloud device 250 from a cloud device 250 of another cloud computing environment 240, from data center device 240, and/or from client device 260. Forwarding function 610 of the particular cloud device 250 may receive broadcast/multicast traffic 910.

Broadcast/multicast traffic 910 may include information associated with multiple destinations. For example, broadcast/multicast traffic 910 may include destination information associated with another cloud device 250 in cloud computing environment 240-1, a cloud device 250 in cloud computing environment 240-2, and a cloud device 250 in cloud computing environment 240-3. Alternatively, or additionally, broadcast/multicast traffic 910 may include destination information associated with one or more other devices. As further shown in FIG. 9, based on the destination information, forwarding function 610 of the particular cloud device 250 may provide broadcast/multicast traffic 910 to the other cloud device 250 in cloud computing environment 240-1, cloud device 250 in cloud computing environment 240-2, and cloud device 250 in cloud computing environment 240-3.

Although FIG. 9 shows example operations capable of being performed by components of example network portion 900, in other implementations, example network portion 900 may include fewer components, different components, differently arranged components, or additional components than depicted in FIG. 9. Additionally, or alternatively, one or more components of example network portion 900 may perform one or more tasks described as being performed by one or more other components of example network portion 900.

Figure 10:
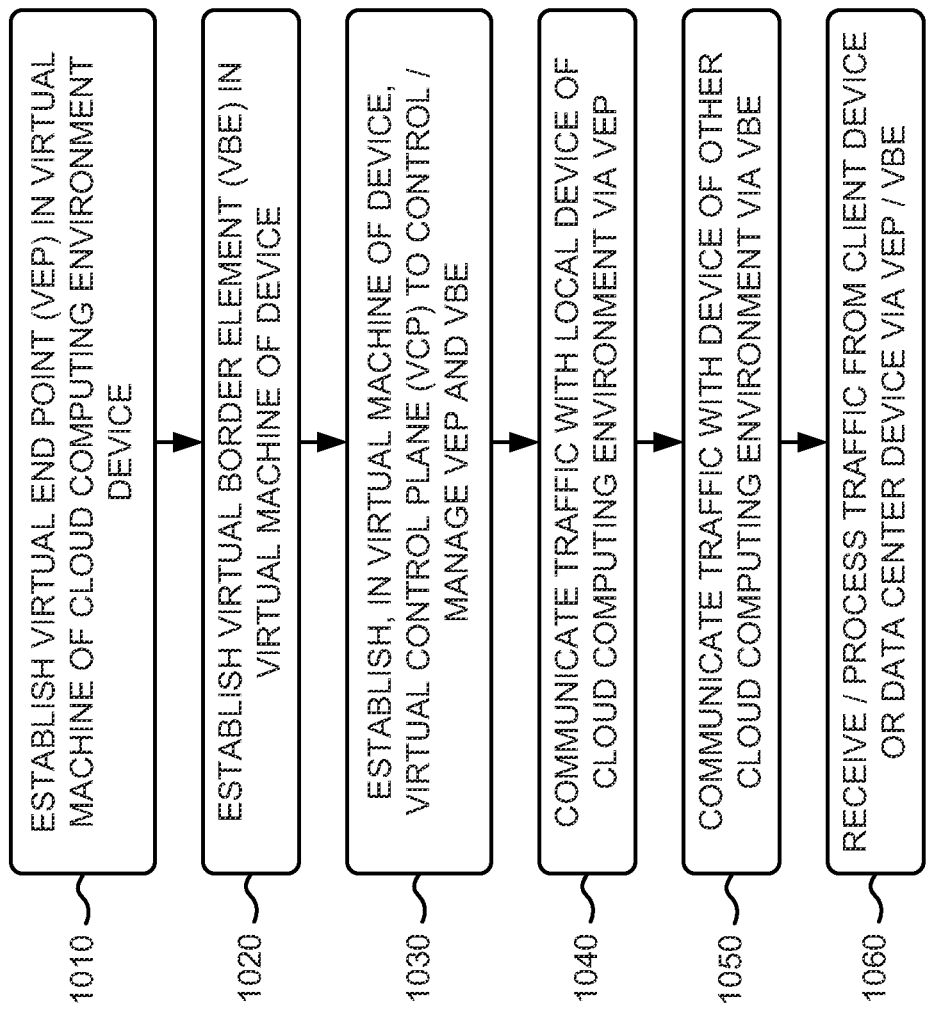
FIGS. 10-12 are flow charts of an example process for providing distributed fabric architecture in a cloud computing environment according to an implementation described herein.
Figure 11:
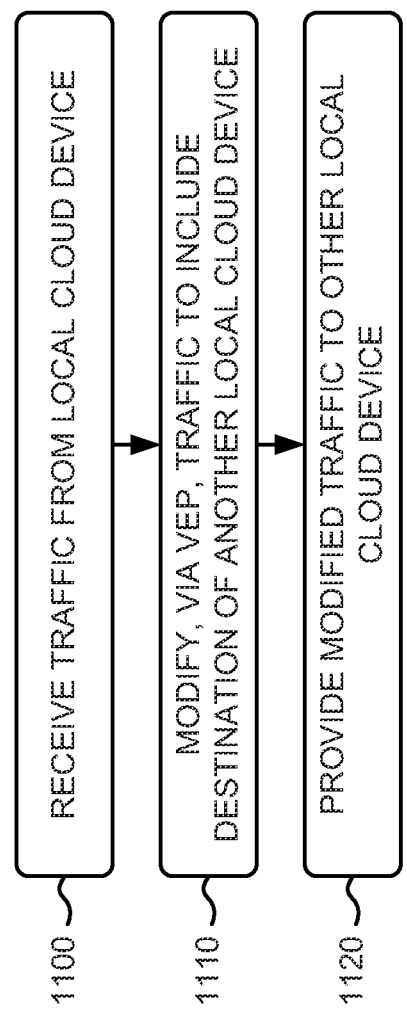
Figure 12:
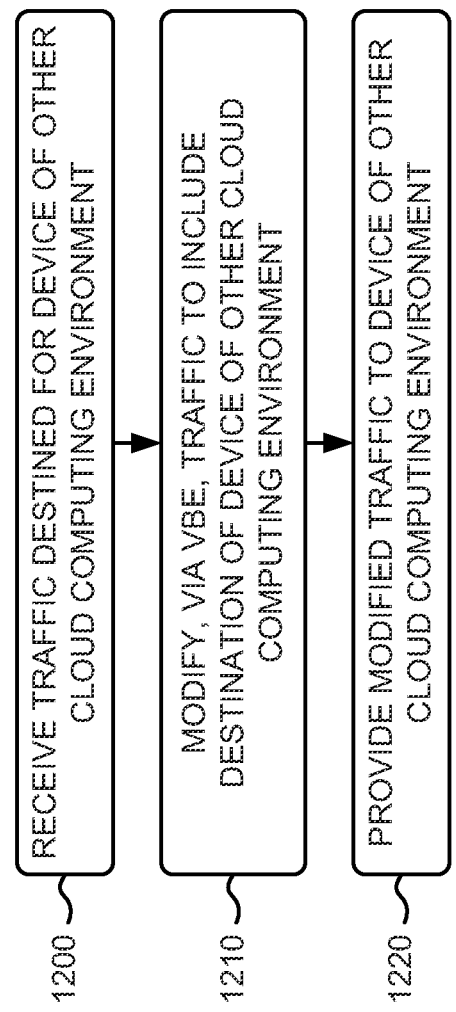

FIGS. 10-12 are flow charts of an example process 1000 for providing distributed fabric architecture in a cloud computing environment according to an implementation described herein. In one implementation, process 1000 may be performed by one or more cloud devices 250. Alternatively, or additionally, some or all of process 1000 may be performed by another device or group of devices, including or excluding one or more cloud devices 250.

As shown in FIG. 10, process 1000 may include establishing a virtual end point (VEP) in a virtual machine of a cloud computing environment device (block 1010), and establishing a virtual border element (VBE) in the virtual machine of the device (block 1020). For example, in an implementation described above in connection with FIG. 7, virtual machine 510 of cloud device 250 may include VEP 740 and VBE 750. VEP 740 may control the functionality of multiplexor/demultiplexor 700, egress engine 710, ingress engine 720, and/or network driver 730. VBE 750 may interconnect dissimilar cloud computing environments 240, and may provide a bridge for L2 and L3 broadcast regions in the dissimilar cloud computing environments 240. VBE 750 may map local trunk ports onto global trunk ports, and may map global trunk ports onto local trunk ports. Alternatively, or additionally, VBE 750 may be used as a load balancing mechanism for cloud device 250.

As further shown in FIG. 10, process 1000 may include establishing, in the virtual machine of the device, a virtual control plane (VCP) to control and/or manage the VEP and the VBE (block 1030). For example, in an implementation described above in connection with FIG. 7, virtual machine 510 of cloud device 250 may include VCP 760. VCP 760 may control and manage the functionality associated with VEP 740 and VBE 750. VCP 760 may provision egress engine 710 and/or ingress engine 720 for transmitting and/or receiving traffic, and may generate alarms when VEP 740 or VBE 750 are not functioning properly.

Returning to FIG. 10, process 1000 may include communicating traffic with a local device of the cloud computing environment via the VEP (block 1040), communicating traffic with a device of another cloud computing environment via the VBE (block 1050). For example, in an implementation described above in connection with FIG. 7, VEP 740 may enable cloud device 250 to communicate local trunk traffic with other cloud devices 250 of a common cloud computing environment 240. VEP 740 may enable the local trunk traffic to be communicated via trunk port 770. VBE 750 may enable cloud device 250 to communicate global trunk traffic with cloud devices 250 of other cloud computing environments 240. VBE 750 may enable the global trunk traffic to be communicated via trunk port 770.

As further shown in FIG. 10, process 1000 may include receiving and processing traffic from a client device or a data center device via the VEP or the VBE (block 1060). For example, in an implementation described above in connection with FIG. 8, access port 780 may receive access traffic, such as access packet 840, from data center device 220 or client device 260. Access port 780 may forward access packet 840 to VEP 740 and/or VBE 750, depending on a destination of access packet 840. VEP 740 and/or VBE 750 may receive access packet 840, and may forward access packet to the destination, such as to one or more applications 500 of cloud device 250.

Process block 1040 may include the process blocks depicted in FIG. 11. As shown in FIG. 11, process block 1040 may include receiving traffic from a local cloud device (block 1100), modifying, via the VEP, traffic to include a destination of another local cloud device (block 1010), and providing the modified traffic to the other local cloud device (block 1020). For example, in an implementation described above in connection with FIG. 8, trunk port 770 may receive local trunk traffic, such as local packet 800, from another cloud device 250 within the same cloud computing environment 240 as cloud device 250. Trunk port 800 may provide local packet 800 to VEP 740, and VEP 740 may receive local packet 800. VEP 740 may modify local packet 800 to include a destination of a particular cloud device 250 within the same cloud computing environment 240 as cloud device 250. VEP 740 may forward modified local packet 810 to trunk port 770, and trunk port 770 may forward modified local packet 810 to the particular cloud device 250 within the same cloud computing environment 240 as cloud device 250.

Process block 1050 may include the process blocks depicted in FIG. 12. As shown in FIG. 12, process block 1050 may include receiving traffic destined for the device of the other cloud computing environment (block 1200), modifying, via the VBE, traffic to include a destination of the device of the other cloud computing environment (block 1210), and providing the modified traffic to the device of the other cloud computing environment (block 1220). For example, in an implementation described above in connection with FIG. 8, trunk port 770 may receive global trunk traffic, such as global packet 820, from another cloud device 250 within a different cloud computing environment 240 than cloud device 250. Trunk port 770 may provide global packet 820 to VBE 750, and VBE 750 may receive global packet 820. VBE 750 may modify global packet 820 to include a destination of a particular cloud device 250 within a different cloud computing environment 240 than cloud device 250. VBE 750 may forward modified global packet 830 to trunk port 770, and trunk port 770 may forward modified global packet 830 to the particular cloud device 250 within a different cloud computing environment 240 than cloud device 250.

Systems and/or methods described herein may provide a distributed fabric architecture in a cloud computing environment. In one example, the systems and/or methods may incorporate forwarding functionality in a virtual machine of each cloud device provided in one or more cloud computing environments. The forwarding functionality may mitigate or eliminate bandwidth and/or scalability issues experienced by the cloud computing environments. The forwarding functionality may enable broadcast and/or multicast traffic to be communicated among the cloud devices.

The foregoing description of implementations provides illustration and description, but is not intended to be exhaustive or to limit the implementations to the precise form disclosed. Modifications and variations are possible in light of the above disclosure or may be acquired from practice of the implementations.

For example, while series of blocks have been described with regard to FIGS. 10-12, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items and may be used interchangeably with 'one or more. Where only one item is intended, the term "one" or similar language is used. Further, the phrase "based on" is intended to mean "based, at least in part, on" unless explicitly stated otherwise.

What is claimed is:

1. A method comprising:
 establishing, by one or more hardware processors of a cloud device that is included in a cloud computing environment, a local forwarding function in a virtual machine of the cloud device,
  the local forwarding function connecting the cloud device with one or more local devices associated with the cloud computing environment;
 establishing, by the one or more hardware processors of the cloud device, a global forwarding function in the virtual machine of the cloud device, the global forwarding function connecting the cloud device with one or more global devices associated with one or more other cloud computing environments, the global forwarding function interconnecting the cloud computing environment and a particular cloud computing environment of the one or more other cloud computing environments, the cloud computing environment being dissimilar from the particular cloud computing environment, and the global forwarding function enabling a bridge for broadcast regions in the cloud computing environment and the particular cloud computing environment;
 using, by the one or more hardware processors of the cloud device, the global forwarding function to create a mapping of local trunk ports, of the cloud computing environment, onto global trunk ports;
 establishing, by the one or more hardware processors of the cloud device, a virtual control plane in the virtual machine of the cloud device,
  the virtual control plane controlling the local forwarding function and the global forwarding function;
 communicating, by the one or more hardware processors of the cloud device and via the local forwarding function of the cloud device, first traffic with a particular local device of the one or more local devices; and
 communicating, by the one or more hardware processors of the cloud device and via the global forwarding function of the cloud device and based on the mapping of the local trunk ports onto the global trunk ports, second traffic with a particular global device of the one or more global devices.

2. The method of claim 1, further comprising:
 receiving, by the local forwarding function, third traffic from a client device or a data center device; and
 processing the third traffic with the local forwarding function.

3. The method of claim 2, where the third traffic includes access traffic.

4. The method of claim 1, further comprising:
 receiving, by the global forwarding function, third traffic from a client device or a data center device; and
 processing the third traffic with the global forwarding function.

5. The method of claim 1, where communicating the first traffic with the particular local device comprises:
 receiving the first traffic from one of the one or more local devices;
 modifying, via the local forwarding function, the first traffic to include a destination of the particular local device; and
 providing the modified first traffic to the particular local device.

6. The method of claim 1, where communicating the second traffic with the particular global device comprises:
 receiving the second traffic from one of the one or more global devices;
 modifying, via the global forwarding function, the second traffic to include a destination of the particular global device; and providing the modified second traffic to the particular global device.

7. The method of claim 1, where:
the first traffic includes local trunk traffic, and
the second traffic includes global trunk traffic.

8. A cloud device,
the cloud device being included in a cloud computing environment, and
the cloud device comprising:
a hardware processor to:
create a local forwarding function in a virtual machine of the cloud device, the local forwarding function connecting the cloud device with one or more local devices associated with the cloud computing environment;
create a global forwarding function in the virtual machine of the cloud device, the global forwarding function connecting the cloud device with one or more global devices associated with one or more other cloud computing environments, the global forwarding function interconnecting the cloud computing environment and a particular cloud computing environment of the one or more other cloud computing environments, the cloud computing environment being dissimilar from the particular cloud computing environment, and the global forwarding function enabling a bridge for broadcast regions in the cloud computing environment and the particular cloud computing environment;
use the global forwarding function to create a mapping of local trunk ports onto global trunk ports;
create a virtual control plane in the virtual machine of the cloud device, the virtual control plane controlling the local forwarding function and the global forwarding function,
communicate, via the local forwarding function, first traffic with a particular local device of the one or more local devices and
communicate, via the global forwarding function and based on the mapping of the local trunk ports onto the global trunk ports, second traffic with a particular global device of the one or more global devices.

9. The cloud device of claim 8, where the hardware processor is further to:
receive third traffic from a client device or a data center device, and
provide, via the local forwarding function, the third traffic to one or more applications being executed by the cloud device.

10. The cloud device of claim 9, where the third traffic includes access traffic.

11. The cloud device of claim 8, where the hardware processor is further to:
receive third traffic from a client device or a data center device, and
provide, via the global forwarding function, the third traffic to one or more applications being executed by the cloud device.

12. The cloud device of claim 8, where, when communicating the first traffic with the particular local device, the hardware processor is to:
receive the first traffic from one of the one or more local devices,
modify, via the local forwarding function, the first traffic to include a destination of the particular local device, and
provide the modified first traffic to the particular local device.

13. The cloud device of claim 8, where, when communicating the second traffic with the particular global device, the hardware processor is to:
receive the second traffic from one of the one or more global devices,
modify, via the global forwarding function, the second traffic to include a destination of the particular global device, and
provide the modified second traffic to the particular global device.

14. The cloud device of claim 8, where:
the first traffic includes local trunk traffic, and
the second traffic includes global trunk traffic.

15. A non-transitory computer-readable medium storing instructions, the instructions comprising:
one or more instructions that, when executed by one or more hardware processors of a cloud device that is included in a cloud computing environment, cause the one or more hardware processors to:
establish a virtual end point in a virtual machine of the cloud device,
the virtual end point connecting the cloud device with one or more local devices associated with the cloud computing environment;
establish a virtual border element in the virtual machine of the cloud device, the virtual border element connecting the cloud device with one or more global devices associated with one or more other cloud computing environments, the virtual border element interconnecting the cloud computing environment and a particular cloud computing environment of the one or more other cloud computing environments, the cloud computing environment being dissimilar from the particular cloud computing environment, and the virtual border element providing a bridge for broadcast regions in the cloud computing environment and the particular cloud computing environment,
use the virtual border element to create a mapping of local trunk ports of the particular cloud computing environment onto global trunk ports;
establish a virtual control plane in the virtual machine of the cloud device,
the virtual control plane controlling the virtual end point and the virtual border element;
utilize the virtual end point to communicate first traffic with a particular local device of the one or more local devices, and
utilize, based on the mapping of the local trunk ports onto the global trunk ports, the virtual border element to communicate second traffic with a particular global device of the one or more global devices.

16. The non-transitory computer-readable medium of claim 15, further comprising:
one or more instructions that, when executed by the one or more hardware processors of the cloud device, cause the one or more hardware processors to:
receive, by the virtual end point, third traffic from a client device or a data center device, and
process the third traffic with the virtual end point.

17. The non-transitory computer-readable medium of claim 15, further comprising:
one or more instructions that, when executed by the one or more hardware processors of the cloud device, cause the one or more hardware processors to:
receive, by the virtual border element, third traffic from a client device or a data center device, and
process the third traffic with the virtual border element.

18. The non-transitory computer-readable medium of claim 15, further comprising:
    one or more instructions that, when executed by the one or more hardware processors of the cloud device, cause the one or more hardware processors to:
      receive the first traffic from one of the one or more local devices,
      modify, via the virtual end point, the first traffic to include a destination of the particular local device, and
      provide the modified first traffic to the particular local device.

19. The non-transitory computer-readable medium of claim 15, further comprising:
    one or more instructions that, when executed by the one or more hardware processors of the cloud device, cause the one or more hardware processors to:
      receive the second traffic from one of the one or more global devices,
      modify, via the virtual border element, the second traffic to include a destination of the particular global device, and
      provide the modified second traffic to the particular global device.

20. The non-transitory computer-readable medium of claim 15, where:
    the first traffic includes local trunk traffic, and
    the second traffic includes global trunk traffic.

* * * * *